(12) United States Patent
Sugawara et al.

(10) Patent No.: US 7,855,239 B2
(45) Date of Patent: Dec. 21, 2010

(54) EXTRUDED PROPYLENE RESIN FOAM

(75) Inventors: Minoru Sugawara, Ichihara (JP); Yasuhiko Otsuki, Ichihara (JP); Ryoichi Tsunori, Ichihara (JP)

(73) Assignee: Prime Polymer Co., Ltd., Tokyo (JP)

( * ) Notice: Subject to any disclaimer, the term of this patent is extended or adjusted under 35 U.S.C. 154(b) by 0 days.

(21) Appl. No.: 11/719,711

(22) PCT Filed: Nov. 18, 2005

(86) PCT No.: PCT/JP2005/021281

§ 371 (c)(1),
(2), (4) Date: May 18, 2007

(87) PCT Pub. No.: WO2006/054714

PCT Pub. Date: May 26, 2006

(65) Prior Publication Data

US 2008/0176971 A1    Jul. 24, 2008

(30) Foreign Application Priority Data

Nov. 19, 2004  (JP) .............................. 2004-336679

(51) Int. Cl.
*C08J 9/32* (2006.01)
*C08J 9/04* (2006.01)
*C08F 10/06* (2006.01)
*C08K 3/00* (2006.01)
*B32B 3/00* (2006.01)

(52) U.S. Cl. ........................... 521/79; 521/50; 521/142; 521/97; 521/82; 428/35.7; 524/582

(58) Field of Classification Search ................. 521/145, 521/97, 50, 79; 428/34.1, 35.7

See application file for complete search history.

(56) References Cited

U.S. PATENT DOCUMENTS 4,115,532 A * 9/1978 Yamaguchi et al. .......... 423/492

(Continued)

FOREIGN PATENT DOCUMENTS

EP     0 841 354 B1    5/1998

(Continued)

OTHER PUBLICATIONS

U.S. Appl. No. 11/719,710, filed May 18, 2007, Sugawara, et al.

*Primary Examiner*—Randy Gulakowski
*Assistant Examiner*—Kara Negrelli
(74) *Attorney, Agent, or Firm*—Oblon, Spivak, McClelland, Maier & Neustadt, L.L.P.

(57) ABSTRACT

An object of the present invention is to provide an extruded propylene-based resin foam in which a average diameter of cells therein can be reduced while a high expansion ratio remains high, thereby providing an excellent insulation efficiency. The extruded propylene-based resin foam according to the present invention is extruded propylene-based resin foam that is formed by extrusion-foaming a propylene-based resin, and the extruded propylene-based resin foam has the expansion ratio of 10 or more and the average cell diameter of less than 400 μm. With this configuration, the extruded foam can have a plurality of air bubble walls therein. Thus, the extruded propylene-based resin foam can efficiently block external radiant heat, thereby realizing excellent insulation efficiency.

21 Claims, 1 Drawing Sheet

U.S. PATENT DOCUMENTS

| | | | | |
|---|---|---|---|---|
| 5,527,573 | A | * | 6/1996 | Park et al. ............... 428/314.8 |
| 2004/0062885 | A1 | * | 4/2004 | Imanari et al. ............. 428/34.1 |

FOREIGN PATENT DOCUMENTS

| | | |
|---|---|---|
| JP | 53 1262 | 1/1978 |
| JP | 7 292147 | 11/1995 |
| JP | 9 25354 | 1/1997 |
| JP | 9 95550 | 4/1997 |
| JP | 10 279632 | 10/1998 |
| JP | 11-181136 * | 6/1999 |
| JP | 11-181136 A * | 6/1999 |
| JP | 2000 143858 | 5/2000 |
| JP | 2000 309670 | 11/2000 |
| JP | 2000 336198 | 12/2000 |
| JP | 2001 1384 | 1/2001 |
| JP | 2002 12717 | 1/2002 |
| JP | 2002 509575 | 3/2002 |
| JP | 2002 105256 | 4/2002 |
| JP | 2002 511917 | 4/2002 |
| JP | 2002 322213 | 11/2002 |
| JP | 2002 542360 | 12/2002 |
| JP | 2003 94504 | 4/2003 |
| JP | 2004 217755 | 8/2004 |
| JP | 2004 237729 | 8/2004 |
| WO | 95 20622 | 8/1995 |
| WO | 2005 097842 | 10/2005 |

* cited by examiner

EXTRUDED PROPYLENE RESIN FOAM

This application is a 371 of PCT/JP2005/021281 filed Nov. 18, 2005.

TECHNICAL FIELD

The present invention relates to extruded propylene-based resin foam having an excellent insulation efficiency due to a high expansion ratio and a small average cell diameter.

BACKGROUND ART

Extruded foam molded by extrusion-foaming a thermoplastic resin and an assembly of bundled threads of the extruded foam molded by a so-called strand-extrusion involving the steps of extruding the thermoplastic resin from dies having a large number of small pores; bundling extruded resin threads together; and fusing and foaming the surfaces thereof are excellent in mechanical properties even though light in weight. Therefore, the foam is broadly applied as structural materials in various fields, such as the fields of building construction, civil engineering and the fields of automobiles, in particular, employed as thermal insulating materials. As such extruded foam of a thermoplastic resin extruded foam formed of polyurethane-based resins or polystyrene-based resins is known.

However, a polyurethane resin and a polystyrene resin are materials that are not always excellent in recycling characteristics, and there is a problem that when these resins are used, it is difficult to sufficiently comply with the construction recycling law (law on recycling of materials for construction works, etc.). In addition, the polystyrene resin has poor heat resistance and chemical resistance. Therefore extruded foam made of a thermoplastic resin that is alternative to those resins has been demanded.

On the other hand, a polypropylene-based resin, which is excellent in mechanical property, heat-resisting property chemical resistance, electrical property and the like, is also a low cost material, so that it is widely used in various molding fields. Thus, extruded foam of the polypropylene-based resin is also expected to have high industrial utility. However when melted, polypropylene, which is a linear polymer resin, may decrease the strength as a result of a drastic decrease in viscosity, and consequently the resin hardly holds the air bubbles of foam and foam braking can easily occur. Therefore, it is difficult to obtain extruded foam having as high a closed cell content air bubbles and high an expansion ratio as those of the conventional thermoplastic resins. In addition, it is difficult to uniform and densify the diameters of the foam cells (air bubbles) of the extruded molded product. Therefore, an improvement in moldability has been desired.

Here, insulation efficiency in a case that the extruded foam is used as a thermal insulation material depends on both the expansion ratio and the cell diameter at a certain range of expansion ratio (for example, 10 or more). In other words, a higher expansion ratio leads to an enhanced insulation efficiency because the thinner a material wall is, the smaller a heat-transfer amount is. Similarly, when the cell diameter is reduced with the same expansion ratio, the number of cell walls blocking radiant heat increase, so that less heat is conducted, thereby improving heat insulation properties. Accordingly, the smaller cell diameter is preferred. As described above, in a state where expansion ratio is made high, when an average cell diameter is made small to improve the heat insulation efficiency a thickness of molded product can be reduced, which also brings an additional effect of cost reduction. Therefore, notwithstanding the difficulty of the moldability as described above, there has been a need of an improved expansion ratio and a decreased cell diameter.

Under such a circumstance, researches have been carried out to improve the expansion ratio and reduce the cell diameter of the extruded propylene-based resin foam. For example, there is provided an assembly of bundled threads of extruded foam made of a polypropylene-based resin (i.e., a structural material of the resin foam), the structural material having a biaxial extensional viscosity of $3 \times 10^6$ poises or more and a biaxial strain hardening rate of 0.25 or more at a biaxial extensional strain of 0.2 and (see, Patent Document 1). In addition, there is also provided an assembly of bundled threads of an extruded foam obtained through steps of melt-kneading a mixture of a predetermined polypropylene-based resin and a foaming agent in an extruder; extrusion-foaming the mixture from the extrusion die having a plurality of small pores to be formed into threads under low-temperature and low-pressure conditions after the temperature is adjusted suitably for foaming; and transferring the threads into a cylindrical device for bundling and fusing while the threads of the foam is softened (see, for example, Patent Document 2).

[Patent Document 1] JP 09-25354 A
[Patent Document 2] JP 2001-1384 A

DISCLOSURE OF INVENTION

Problems to be Solved by the Invention

However, although such a conventional extruded propylene-based resin foam as disclosed in the above-mentioned patent documents can provide an improvement of expansion ratio to some extent, it is difficult to reduce the average cell diameter to less than 400 μm. Thus, the difficulty has been impeditive to a further improvement in the insulation efficiency.

Therefore, it is an object of the present invention to provide extruded propylene-based resin foam in which an average diameter of cells therein can be reduced while a high expansion ratio remains high, thereby providing an excellent insulation efficiency.

Means for Solving the Problems

In order to achieve the above-mentioned object, the extruded propylene-based resin foam according to an aspect of the present invention is extruded propylene-based resin foam that is formed by extrusion-foaming a propylene-based resin, the extruded propylene-based resin foam having: an expansion ratio of 10 or more; and an average cell diameter of less than 400 μm.

The extruded propylene-based resin foam according to the aspect of the present invention has the expansion ratio of 10 or more and the average cell diameter (air bubble diameter) of less than 400 μm, so that a large number of air bubble walls can be formed in the extruded foam, thereby efficiently blocking radiation heat from the outside. As a result, extruded foam excellent in insulation efficiency can be provided.

A propylene-based resin constituting the extruded foam has not only an excellent recycling performance, but also a favorable chemical resistance, heat-resistance, and the like. Accordingly, the extruded propylene-based resin foam according to the present invention also has such properties (recycling performance, chemical resistance, and heat-resistance). Further, the use of the propylene-based resin that is a low cost material makes it possible to provide extruded foam having the above-mentioned effects at low cost.

In the extruded propylene-based resin foam according to the aspect of the present invention, a closed cell content is preferably 40 or more %.

According to this aspect of the present invention, the extruded propylene-based resin foam has an independent foam rate of 40 or more % so that a large number of air bubbles prevent the heat from being transferred. Thus, the extruded foam has an enhanced insulation efficiency, excellent mechanical strengths such as an impact strength, and an excellent moisture resistance.

In the extruded propylene-based resin foam according to the aspect of the present invention the average cell diameter is preferably 200 μm or less.

According to this aspect of the present invention, the extruded propylene-based resin foam has the average cell diameter is further reduced to 200 μm or less, so that more air bubble walls can be formed in the extruded foam. Therefore, the extruded foam has more excellent insulation efficiency.

The extruded propylene-based resin foam according to the aspect of the present invention is preferably an assembly of bundled threads of an extruded foam in which a plurality of extrusion-foamed threads are bundled.

According to this aspect of the present invention, the extruded propylene-based resin foam is formed as an assembly of bundled threads where a large number of threads of the extruded foam are bundled together. Accordingly, the expansion ratio of the extruded foam can be enhanced. Therefore, it is easy to mold a molded foam product having a high expansion ratio and a sufficient thickness in various forms.

In the extruded propylene-based resin foam according to the aspect of the present invention, the propylene-based resin constituting the foam is preferably a propylene-based multistage polymer made of the following constituents (A) and (B): (A) a constituent containing a propylene homopolymer component having a intrinsic viscosity [η] of more than 10 dL/g, which is measured in a tetralin solvent at 135° C. or a copolymer component of propylene and a-olefin having carbon number of 2 to 8, the component occupying 5 to 15 mass % of the total polymer; and (B) a constituent containing a propylene homopolymer component having a intrinsic viscosity [η] of 0.5 to 3.0 dL/g, which is measured in a tetralin solvent at 135° C. or a copolymer component of propylene and a-olefin having carbon number of 2 to 8, the component occupying 85 to 95 mass % of the total polymer.

The propylene-based multistage polymer is a linear propylene-based polymer having a higher melt tension due to the addition of the constituent (A) that is an ultrahigh-molecular-weight propylene based polymer. The multistage polymer also has an excellent viscoelastic property because the viscoelasticity is adjusted by controlling a molecular weight distribution.

Therefore, by using the propylene-based multistage polymer having the excellent viscoelastic property as the constituent material, the extruded propylene-based resin foam can reliably has the expansion ratio of 10 or more, the average cell diameter of less than 400 μm (preferably 200 μm or less). In addition, according to the propylene-based multistage polymer, the closed cell content in the extruded foam can be increased. For example, the closed cell content of 40 or more % car be surely attained.

In the extruded propylene-based resin foam according to the aspect of the present invention, a relationship between a melt flow rate (MFR) at 230° C. and a melt tension (MT) at 230° C. of the propylene-based multistage polymer preferably satisfies the following expression (I):

$$\log(MT) > -1.33 \log(MFR) + 1.2 \qquad (1)$$

According to this aspect of the present invention, the relationship between the melt flow rate (MFR) at 230° C. and the melt tension (MT) at 230° C. is represented by the above-mentioned expression (I). Therefore, molding of a foam-molding having the high expansion ratio can be realized, and the extruded foam can easily and reliably have the expansion ratio of 10 or more.

BEST MODE FOR CARRYING OUT THE INVENTION

The extruded propylene-based resin foam according to the present invention (hereinafter referred to as extruded foam) is provided by extrusion-foaming a propylene-based resin, and has the expansion ratio of 10 or more and the average cell diameter of less than 400 μm. With this arrangement, the extruded foam having the excellent insulation efficiency can be provided.

In addition, when the extruded foam has the closed cell content of 40 or more preferably 60 or more %, a large number of independent air bubbles substantially prevents heat from being transferred. Therefore, the extruded foam has the further advanced insulation efficiency, excellent mechanical strengths such as impact strength, and excellent moisture resistance.

As the propylene-based resin forming the extruded foam of the present invention configured as described above, any propylene-based resin having high melt tension when melted can be used. For example, any of those described in JP 10-279632 A, JP 2000-309670 A, JP 2000-336198 A, JP 2002-12717 A, JP 2002-542360 A, and JP 2002-509575 A can be used.

Further, as described above, for obtaining the extruded foam of the present invention, it is preferable, to increase the melt tension of the resin at the time of melting and to use as the polypropylene-based resin a resin material having excellent viscoelastic property.

As an example of the propylene-based resin having excellent viscoelastic property as described above, it is advantageous to use as the a propylene-based resin constituting a foam a propylene-based multistage polymer including constituents (A) and (B) as described below:

(A) a constituent containing a propylene homopolymer component having a intrinsic viscosity [η] of more than 10 dL/g, which is measured in a tetralin solvent at 135° C. or a copolymer component of propylene and a-olefin having carbon number of 2 to 8, of the component occupying 5 to 20 mass % of the total polymer; and (B) a constituent containing a propylene homopolymer component having a intrinsic viscosity [η] of 0.5 to 3.0 dL/g, which is measured in a tetralin solvent at 135° C. or a copolymer component of propylene and a-olefin having carbon number of 2 to 8, the component occupying 80 to 95 mass % of the total polymer.

The propylene-based multistage polymer is a linear propylene-based polymer having a higher melt tension due to the addition of the constituent (A) that is an ultrahigh-molecular-weight propylene based polymer. The multistage polymer also has a viscoelastic property adjusted by controlling a molecular weight distribution. The use of such a propylene-based multistage polymer having the excellent viscoelastic property as a component material is preferable because the propylene-based polymer meeting the requirements of the present invention as described above (i.e. the expansion ratio of 10 or more, the average cell diameter of less than 400 μm (preferably 200 μm or less), and the closed cell content of 40 or more %) can be reliably provided.

Now, the melt tension becomes insufficient when the component (A) has a intrinsic viscosity of 10 dL/g or less. Thus, the desired foaming performance may not be obtained.

In addition, when the mass fraction of the component (A) is less than 5 mass %, the melt tension becomes insufficient and the desired foaming performance may not be obtained. In contrast, when the mass fraction exceeds 20 mass %, a so-called melt fracture may intensify, which leads to a rough surface or the like of the extruded foam and resulting in a decrease in product quality.

The intrinsic viscosity of the component (A) is preferably more than 10 dL/g as described above, more preferably in the range of 11 to 20 dL/g, and particularly preferably in the range of 13 to 18 dL/g.

In addition, the mass fraction of the component (A) is preferably in the range of 8 to 18 mass %, and particularly preferably in the range of 10 to 16 mass %.

The melt tension becomes insufficient when the intrinsic viscosity of the component (B) is less than 0.5 dL/g and the desired foaming performance may not be obtained. In contrast, when it exceeds 3.0 dL/g, the viscosity becomes too high and a suitable extrusion molding process may not be performed.

Further when the mass fraction of the component (B) is less than 80 mass %, a preferable extrusion molding process may not be easily performed. When the mass fraction exceeds 95 mass %, likewise the melt tension becomes low and a preferable extrusion molding process may not be easily performed.

As descried above the component (B) has a intrinsic viscosity preferably in the range of 0.5 to 3.0 dL/g, more preferably in the range of 0.8 to 2.0 dL/g and particularly preferably in the range of 1.0 to 1.5 dL/g.

Further the mass fraction of the component (B) is preferably in the range of 82 to 92 mass %, and particularly preferably in the range of 84 to 90 mass %.

In this propylene-based multistage polymer, a-olefin having carbon number of 2 to 8 as a constituent component of the copolymer component, can be, for example, a-olefins other than propylene, such as ethylene and 1-butene. Among them, it is preferable to use ethylene.

In addition, the propylene-based multistage polymer has the melt flow rate (MFR) at 230° C. of preferably 100 g/10 min. or less, and particularly preferably 20 g/10 min. or less. When MFR exceeds 100 g/10 min., the melt tension and viscosity of the multistage polymer become low, the molding can be made difficult.

The propylene-based multistage polymer preferably has a relationship between the melt flow rate (MFR) at 230° C. and the melt tension (MT) at 230° C. represented by the following expression (I).

$$\log(MT) > -1.33 \log(MFR) + 1.2 \quad \text{(I)}$$

Here, when the relationship between the melt flow rate (MFR) at 230° C. and the melt tension (MT) at 230° C. does not satisfy the above expression (I), it becomes difficult to perform the molding process of the foam with high expansion ratio. In such a case, the extruded foam having an expansion ratio of 10 or more may not be obtained. The constant (1.2) in the expression is preferably 1.3 or more, particularly preferably 1.4 or more.

Further, in order for the propylene-based multistage polymer to have the relationship represented by the expression (I), the polymer may include 5 mass % of the component (A).

In the propylene-based multistage polymer, it is preferable that as a dynamic viscoelasticity in a molten state (the relationship between angular frequency ω and storage-modulus G'), an inclination of storage modulus at a side of high frequencies is more than a predetermined level. Specifically, the ratio $G'(10)/G'(1)$ of the storage modulus $G'(10)$ at the angular frequency of 10 rad/s to the storage modulus $G'(1)$ at the angular frequency of 1 rad/s is preferably 2.0 or more, and particularly preferably 2.5 or more. When the ratio $G'(10)/G'(1)$ is smaller than 2.0, the stability of the extruded foam may decrease when an external deformation such as elongation is applied to the extruded foam.

Similarly in the propylene-based multistage polymer, it is preferable that as a dynamic viscoelasticity in a molten state, an inclination of the storage modulus at a side of low frequencies is less than a predetermined level. Specifically, the ratio $G'(0.1)/G'(0.01)$ of the storage modulus $G'(0.1)$ at the angular frequency of 0.1 rad/s to the storage modulus $G'(0.01)$ at the angular frequency of 0.01 rad/s is preferably 6.0 or less, and particularly preferably 4.0 or less. When the ratio $G'(0.1)/G'(0.01)$ exceeds 6.0, the expansion ratio of the extruded foam may not be easily enhanced.

The propylene-based multistage polymer can be produced by polymerizing the propylene or copolymer-zing propylene with a-olefin having carbon number of 2 to 8 in a polymerization procedure including two or more stages, using olefin-polymerization catalysts including the following components (a) and (b) or the following components (a), (b), and (c):

(a) A solid catalyst component produced by processing titanium trichloride produced by reducing titanium tetrachloride with an organic aluminum compound by an ether compound and an electron acceptor;

(b) An organic aluminum compound; and (c) Cyclic ester compound.

In (a) the solid catalyst component produced by processing the titanium trichloride produced by reducing the titanium tetrachloride with the organic aluminum compound by the ether compound and the electron acceptor (hereinafter, also simply referred to as "(a) solid catalyst component"), as the organic aluminum compounds to be used for reducing titanium tetrachloride, there may be used, for example (i) alkyl aluminum dihalide, specifically methyl aluminum dichloride, ethyl aluminum dichloride, and n-propyl aluminum dichloride; (ii) alkyl aluminum sesquihalide, specifically ethyl aluminum sesquichloride; (iii) dialkyl aluminum halide, specifically dimethyl aluminum chloride, diethyl aluminum chloride, di-n-propyl aluminum chloride, and diethyl aluminum bromide; (iv) trialkyl aluminum, specifically trimethyl aluminum, triethyl aluminum and triisobutyl aluminum; and (v) dialkyl aluminum hydride, specifically diethyl aluminum hydride. Here, the term "alkyl" refers to lower alkyl such as methyl, ethyl, propyl, or butyl. In addition, the term "halide" refers to chloride or bromide. Particularly the former is generally used.

The reduction reaction of the organic aluminum compound for obtaining the titanium trichloride is generally performed at temperatures ranging from −60 to 60° C., preferably −30 to 30° C. If the reduction reaction is performed at a temperature of less than −60° C., the reduction reaction will require an extended period of time. In contrast, when the reduction reaction is performed at a temperature of more than 60° C., an excessive reduction may partially occur, which is unfavorable. The reduction reaction is preferably performed under the presence of an inactivated hydrocarbon solvent such as pentane, heptane, octane, and decane.

Further, it is preferable to perform an ether treatment and an electron acceptor treatment on the titanium trichloride obtained by the reduction reaction of the titanium tetrachloride with the organic aluminum compound.

Examples of ether compounds, which can be preferably used in the ether treatment of the titanium trichloride, include ether compounds in which each hydrocarbon residue is a chain hydrocarbon having carbon number of 2 to 8, such as diethyl ether, di-n-propyl ether, di-n-butyl ether, diisoamyl ether, dineopentyl ether, di-n-hexyl ether, di-n-octyl ether, di-2-ethyl hexyl ether, methyl-n-butyl ether, and ethyl-isobutyl ether. Among them in particular, use of di-n-butyl ether is preferable.

Preferable examples of the electron acceptors that can be used in the treatment of titanium trichloride include halogenated compounds of elements in groups III to IV and VIII in the periodic table, specifically, titanium tetrachloride, silicon tetrachloride, boron trifluoride, boron trichloride, antimony pentachloride, gallium trichloride, ferric trichloride, tellurium dichloride, tin tetrachloride, phosphorus trichloride, phosphorus pentachloride, vanadium tetrachloride and zirconium tetrachloride.

The treatment of titanium trichloride with the ether compound and the electron acceptor in preparation of solid catalyst component (a) may be performed using a mixture of both treatment agents, or may be performed using one of these treatment agents at first and then the other afterward. Note that among them, the latter is more preferable than the former: the treatment with the electron acceptor after the treatment with ether is more preferable.

Prior to the treatment with the ether compound and the electron acceptor, the titanium trichloride is preferably washed with hydrocarbon. The above-mentioned ether treatment with titanium trichloride is performed such that the titanium trichloride is brought into contact with the ether compound. The titanium trichloride treatment with the ether compound is advantageous when performed such that those two are brought into contact with each other in the presence of a diluent. Examples of the diluent preferably include inactivated hydrocarbon compounds such as hexane, heptane, octane, decane, benzene, and toluene. A treatment temperature in the ether treatment is preferably in the range of 0 to 100° C. In addition although a time period for the treatment is not specifically limited, the treatment is generally performed in the range of 20 minutes to 5 hours.

An amount of the ether compound used may be generally 0.05 to 3.0 mol, preferably 0.5 to 1.5 mol per tool of the titanium trichloride. It is not preferable that the amount of the ether compound used is less than 0.05 mol because a sufficient increase in stereo regularity of a polymer to be produced is impaired. On the other hand, it is unfavorable that the amount of the ether compound used exceeds 3.0 mol because yield can be decreased even though stereo regularity of a polymer to be generated increases. Note that the titanium trichloride treated with the organic aluminum compound or the ether compound is a composition mainly containing titanium trichloride.

Further, as the solid catalyst component (a), Solvay-type titanium trichloride may be preferably used.

As the organic aluminum compound (b), the same organic aluminum compound as described above may be used.

Examples of the cyclic ester compound (c) include γ-lactone, δ-lactone, and ε-lactone among them, ε-lactone is preferably used.

Further, the catalyst for olefin polymerization used in the production of the propylene-based multistage polymer can be obtained by mixing the components (a) to (c) as described above.

For obtaining the propylene-based multistage polymer among two-stage polymerization methods, it is preferable to polymerize propylene or copolymerize propylene and a-olefin having carbon number of 2 to 8 in the absence of hydrogen. Here, the term "in the absence of hydrogen" means "substantially in the absence of hydrogen", so that it includes not only the complete absence of hydrogen but also the presence of a minute amount of hydrogen (for example, about 10 molppm). In short, the term "in the absence of hydrogen" includes a case of containing hydrogen in an amount small enough to prevent the intrinsic viscosity [η] of the propylene-based polymer or of the propylene-based copolymer at the first stage, which is measured in a tetralin solvent at 135° C., from becoming 10 dL/g or less.

In the absence of hydrogen as described above, the polymerization of propylene or the copolymerization of propylene with a-olefin may result in the production of component (A) of the propylene-based multistage polymer as a ultrahigh-molecular-weight propylene-based polymer. The component (A) may be preferably produced by slurry polymerization of a raw material monomer in the absence of hydrogen at a polymerization temperature of preferably 20 to 80° C. more preferably 40 to 70° C., with a polymerization pressure of generally ordinary pressure to 1.47 MPa, preferably 03.9 to 1.18 MPa.

In addition, in this production method, the component (B) of the propylene-based multistage polymer may be preferably produced at the second stage or later. There is no specific limitation for the production conditions of the component (B) except for a limitation that the olefin-based polymer catalyst as described above should be used. However, the component (B) may be preferably produced by polymerizing a raw material monomer in the presence of hydrogen serving as a molecular weight modifier at a polymerization temperature of preferably 20 to 80° C., more preferably 60 to 70° C. with a polymerization pressure of generally ordinary pressure to 1.47 MPa, preferably 0.19 to 1.18 MPa.

In the production method as described above, a preliminary polymerization may be carried out before performing the present polymerization. A powder morphology can be favorably maintained by performing the preliminary polymerization. The preliminary polymerization is generally performed such that propylene in amount of preferably 0.001 to 100 g, more preferably 0.1 to 10 g per gram of solid catalyst component is polymerized or copolymerized with a-olefin having carbon number of 2 to 8 at a polymerization temperature of preferably 0 to 80° C. more preferably 10 to 60° C.

Further, the propylene-based resin contained in the molding material of the extruded foam may be a propylene-based resin composition that includes the propylene-based multistage polymer as described above and the propylene-based polymer having the melt flow rate (MFR) at 230° C. of 30 g/10 min. or less, and the ratio $M_w/M_n$ of weight average molecular weight ($M_w$) and a number average molecular weight ($M_n$) of 50 or less.

The above-mentioned propylene-based multistage polymer may be blended with other materials to provide a resin composition, thereby improving the moldability and high-functionality of the extruded foam, lowering the cost thereof, and the like.

The use of the resin composition allows the extruded foam to have the high melt tension and the excellent viscoelastic property, so that the extruded foam can be provided with the high expansion ratio, good surface appearance, and an effect of preventing drawing fracture at the time of sheet formation.

In the resin composition a weight ratio of the propylene-based polymer to the propylene-based multistage polymer is 6 to 1 or more, preferably 10 to 1 or more. If the weight ratio is smaller than 8 to 1, the surface appearance of the extruded foam may become poor.

The melt flow rate (MFR) of the propylene-based polymer is preferably 30 g/40 min. or less, more preferably 15 g/10 min. or less, particularly preferably 10 g/10 min. or less. When the MFR exceeds 30 g/10 min., a defective molding of the extruded foam may occur.

The $M_w/M_n$ of the propylene-based polymer is preferably 5.0 or less particularly preferably 4.5 or less. If the $M_w/M_n$, exceeds 5.0, the surface appearance of the extruded foam may be deteriorated.

Note that the propylene-based polymer can be produced by any polymerization method using a known catalyst such as a Ziegler-Natta catalyst or a metallocene catalyst.

As the dynamic viscoelasticity in a molten state (the relationship between the angular frequency ω and the storage-modulus G'), the resin composition preferably has a predetermined level or more of the inclination of storage modulus at high frequencies. In addition, the inclination of the storage modulus at low frequencies is preferably a certain level or less.

Specifically, the ratio G'(10)/G'(1) of the storage modulus G'(10) at the angular frequency of 10 rad/s to the storage modulus G'(1) at the angular frequency of 1 rad/s is preferably 5.0 or more, more preferably 5.5 or more. When the ratio G'(10)/G'(1) is smaller than 5.0, the stability of the extruded foam may decrease when an external deformation such as elongation is applied to the extruded foam.

In addition, the ratio G'(0.1)/G'(0.01) of the storage modulus G'(0.1) at the angular frequency of 0.1 rad/s to the storage modulus G'(0.01) at the angular frequency of 0.01 rad/s is preferably 14.0 or less, particularly preferably 12.0 or less. When the ratio G'(0.1)/G'(0.01) exceeds 14.0, the expansion ratio of the extruded foam may not be easily increased.

Here, when the extruded foam is drawn, it is common that components within a relaxation time of 1 to 10 sec leads to a decrease in drawing property of the extruded foam. Thus, the larger a contribution of the relaxation time of this region is, the smaller the inclination of the storage modulus G'(1) becomes at the angular frequency ω of about 1 rad/s. Thus, as an index of the inclination, the ratio G'(10)/G'(1) of the storage modulus G'(10) at the angular frequency ω of 10 rad/s is provided. From the results of a numerical simulation and an experimental analysis, it is found that the smaller the value is, the more breakable foam at the time of drawing of the extruded foam is. Therefore, the resin composition preferably has the G'(10)/G'(1) of 5.0 or more.

For foam breaking at the final stage of the growth of air bubbles or foam breaking accompanying high-speed elongation deformation near the die lips in the extrusion foam-molding process, a certain degree of strain-hardness property is required. Therefore, there is a need of an appropriate amount of the high molecular weight component at an appropriate relaxation time field. For that purpose, the storage modulus G' at the low-frequency region needs to be large to some extent. Therefore, as the index, the ratio G'(0.1)/G'(0.01) of the storage modulus G'(0.1) at the angular frequency ω of 0.1 rad/s to the storage modulus G'(0.01) at the angular frequency of 0.01 rad/s is provided. From the results of a numerical simulation and an experimental analysis, it is found that the larger the value is, the less the expansion ratio becomes due to foam breaking. Therefore, the above-mentioned resin composition preferably has the G'(0.1)/G'(0.01) of 14.0 or less.

Further, as long as the effect of the present invention is not prevented, where required, the propylene-based resin including the resin composition and constituting the extruded foam of the present invention may be added with any of stabilizers such as an antioxidant, a neutralizer, a crystal-nucleus agent, a metal deactivator, a phosphorus processing stabilizer, a UV absorbent, an UV stabilizer, an optical whitening agent, a metallic soap, and an antacid absorbent; and additives such as a cross-linking agent, a chain transfer agent, a nucleating additive, a lubricant, a plasticizer, a filler, an intensifying agent, a pigment, a dye, a flame retardant, and an antistatic agent. The amounts of those additives may be suitably determined depending on the characteristic features and molding conditions, required in the extruded foam to be molded.

When the propylene-based multistage polymer having the excellent melting viscoelasticity as described above is used as the propylene-based resin, the above-described additives can be added to the polymer to be melt-kneaded together into a shape of pallet by a conventionally-known melt-kneading machine in advance, and thereafter, the desired extruded foam may be molded.

The extruded foam of the present invention can be obtained by extrusion-foaming the above-mentioned propylene-based resin. A known extrusion foam-molding device can be used as a production device, in which a propylene-based resin is heated to be melted and then kneaded with a suitable shearing stress applied thereto for extrusion-foaming. An extruder included in the production device may be either a uniaxial extruder or a biaxial extruder. As an extrusion foam-molding device for example, an extrusion foam-molding of a tandem-type disclosed in JP 2004-237729 A may be used, to which two extruders are connected.

In addition, as method to foam the molded product, physical foaming and chemical foaming may be adopted. In the physical foaming, a fluid (gas) is injected into the molten resin material at the time of molding, while in the chemical foaming, a foaming agent is added to and mixed with the resin material.

In the physical foaming, the fluid to be injected may be inert gas such as carbon dioxide (carbonic acid gas) and nitrogen gas. In the chemical foaming, the foaming agent such as azodicarbonamide and azobisisobutyronitrile may be used.

In the above-mentioned physical foaming, it is preferable that carbonic acid gas or nitrogen gas in a supercritical state be injected into the molten resin material because a large number of fine foam cells having the average cell diameter of less than 400 μm, preferably 200 μm or less can be reliably foamed.

Here, the term "supercritical state" refers to a state where the density of a gas and a liquid becomes equal so that the gas and liquid cannot distinguishably exist, due to exceeding of the limiting temperature and the limiting pressure at which both the gas and the liquid can coexist. The fluid produced in this supercritical state is called a supercritical fluid. In addition the temperature and the pressure in a supercritical state are respectively called a supercritical temperature and a supercritical pressure. For example, for carbonic acid gas the supercritical temperature is 31° C. while the supercritical pressure is 7.4 MPa. Further, carbonic acid gas or nitrogen gas in the supercritical state may be injected in an amount of about 4 to 15 mass % with respect to the resin material. It can be injected into the molten resin material in a cylinder.

The shape of the extruded foam may be any known shape of structural materials including a plate, a cylinder, a rectangle, a convex, and a concave shape, but not specifically limited thereto.

Further, the extruded foam may be formed as an assembly of bundled threads of extruded foam. The assembly is formed such that a plurality of threads are extrusion-foamed from the extrusion die in which a plurality of extrusion orifices are formed to be fused and bundled together in the longitudinal direction. By bundling the plurality of threads of the extruded foam to be the assembly of the bundled threads of the extruded foam, the expansion ratio of the extruded foam can be increased. Thus, the foam-molded product having a high expansion ratio and a sufficient thickness can be easily molded into various shapes.

Note that the production of such an assembly of a bundle threads of extruded foam is known in the art and it is disclosed not only for example, in Patent Documents 1 and 2 described above, but also in JP 53-1262 A, and the like.

The shape of the thread which constitutes the assembly of the bundled threads of the extruded foam depends on the shape of the extrusion orifice formed in the extrusion die. The extrusion orifice may have a desirable shape. Examples thereof include a circle, a rhombus, and a slit. In molding, the pressure loss at the outlet portion of the extrusion die is preferably 3 MPa to 50 MPa.

In addition, all the extrusion orifices formed in the extrusion die may be of the same shape, or each of the extrusion orifices may have a different shape such that orifices of various shapes can be formed in one extrusion die.

Further, for example, even when the extrusion orifices are formed in a shape of circle, all the orifices do not need to have the same circle diameter, and the plurality of orifices each may have a different diameter.

The extruded propylene-based resin foam of the present invention thus obtained has the expansion ratio of 10 or more and the average cell diameter of less than 400 μm, so that the air bubble wall can be formed in plurality in the extruded foam. Therefore, a radiation heat from the outside can be effectively blocked and the extruded foam having the excellent insulation efficiency can be provided.

Further, the average cell diameter of the extruded propylene-based resin foam is preferably 200 μm or less. When the average cell diameter is further smaller to be 200 μm or less, more air bubble walls can be formed in the extruded foam. Therefore, the extruded propylene-based foam having an improved insulation efficiency is provided.

The propylene-based resin as the constituent material contained in the extruded propylene-based resin foam of the present invention is also excellent in recycling performance. In addition, it has good chemical resistance and heat-resisting property. Accordingly, the extruded propylene-based resin foam of the present invention is to be provided with those properties (i.e., recycling performance, chemical resistance, and heat-resisting property). Further, the use of the propylene-based resin, which is a low-cost material, can realize the provision of the extruded foam having the above-mentioned effects at a low cost.

The extruded foam of the present invention is excellent in insulation efficiency as described above, so the extruded foam can be used for a structural material (a component of a ceiling, a door, a floor, a cowl, or the like) in the field of automobiles, and a structural material (for example, a building material) in the fields of building construction and civil engineering.

Further, since the extruded foam of the present invention has the average cell diameter as small as less than 400 μm (preferably 200 μm or less), the extruded foam can be provided with an excellent insulation efficiency. When compared with a conventional extruded foam that has the same level of the insulation efficiency, the extruded foam is also advantageous because it can be formed thinner than the conventional foam while maintaining the level of the insulation efficiency. Therefore, for example when the present invention is applied to the fields as described above the extruded foam of the present invention can favorably provide an additional advantage that with the use of the present invention the larger living space can be obtained than with the use of the conventional thermal insulation material.

Note that the embodiment as described above merely represents an example of embodiments of the present invention and the present invention is not limited to the above embodiment. As a matter of course, the modification and improvement to the configuration without departing from the objects and advantages of the present invention shall be included in the scope of the present invention. The specific structure, shape, and the like in embodying the present invention may be any other structure, shape, and the like as long as it does not depart from the objects and advantages of the present invention.

EXAMPLES

The present invention will be described below in more detail with reference to examples and production examples. However, the present invention is not limited to the contents of the examples or the like.

Note that numerical values of solid properties and the like in the examples and the production examples described below were measured by the methods described below.

(1) Mass fractions of a propylene-based polymer component (Component 1) at the first stage and a propylene-based polymer component (Component 2) at the second stage:

The mass fractions were obtained from the mass balance using the flow meter integrated value of propylene continuously supplied at the time of polymerization.

(2) Intrinsic viscosity [η]:

The intrinsic viscosity [η] was measured in a tetralin solvent at 135° C. Further, the intrinsic viscosity [$\eta_2$] of Component 2 was calculated by the following expression (II):

$$[\eta]=([\eta_{total}]\times 100-[\eta_1]\times W_1)/W_2 \qquad (II)$$

[$\eta_{total}$]: Intrinsic viscosity (dL/g) of the entire propylene-based polymer

[$\eta_1$]: intrinsic viscosity (dL/g) of Component 1

$W_1$: Mass fraction (mass %) of Component 1

$W_2$: Mass fraction (mass %) of Component 2

(3) Melt flow rate (MFR):

MFR was measured based on JIS K7210 at a temperature of 230° C. and a weight of 2.16 kgf.

(4) Melt tension (MT):

Capirograph 1C (manufactured by Toyo Seiki Seisaku-sho. Ltd.) was used and measured at a measurement temperature of 230° C. an extrusion rate of 10 mm/min, a drawing temperature of 3.1 m/min. For the measurement, an orifice having a length of 8 mm and a diameter of 2.095 mm was used.

(5) Measurement of viscoelasticity:

The viscoelasticity was measured using a device having the following specifications. In addition, the storage modulus G' was obtainable from a real number part of the complex modulus.

Device: RMS-800 (manufactured by Rheometrics, Co., Ltd.)
Temperature: 190° C.
Distortion: 30%
Frequency: 100 rad/s to 0.01 rad/s Production Example 1

Production of Propylene-based Multistage Polymer (i) Preparation of Pre-colymerization-Catalyst Component:

After a three-necked flask of 5-liter inner volume equipped with a stirrer underwent treatments of sufficient drying and nitrogen gas substitution, 4 liters of dehydrated heptane and 140 grams of diethyl aluminum chloride were added thereinto. Then, 20 grams of commercially-available Solvay titanium trichloride catalyst (manufactured by Tosoh Finechem Corporation) was added. Thereafter, propylene was continuously added into the flask in which a stirring operation was being performed with the temperature maintained at 20° C. After 80 minutes, the stirring was terminated. Consequently, a pre-polymerization catalyst component was produced in which 0.8 g of propylene was polymerized per gram of titanium trichloride catalyst.

(ii) Polymerization of Propylene (1st Stage)

After a stainless autoclave of 10-liter inner volume equipped with a stirrer underwent treatments of sufficient drying and nitrogen gas substitution, 6 liters of dehydrated heptane was added and the nitrogen in the system was replaced with propylene. Thereafter, propylene was added into the autoclave in which a stirring operation was being performed. The inside of the system was then stabilized at an inner temperature of 60° C. and a total pressure of 0.78 MPa. Subsequently, 50 milliliters of heptane slurry was added into the autoclave, the heptane slurry containing the pre-polymerization catalyst component obtained in the above-mentioned (i) at an amount equivalent to 0.75 grams of the solid catalyst, thereby initiating a polymerization. The yield of the polymer, which was calculated from the integrated value of propylene flow when the propylene was continuously supplied for 35 minutes, was 151 grams. Sampling and analyzing of a part of the polymer proved that the intrinsic viscosity was 14.1 dL/g. After that, the inner temperature was lowered to 40° C. or less, the stirring was slowed down, and the pressure was released (iii) Polymerization of Propylene (2nd Stage)

After the pressure is released, the inner temperature was again increased to 60° C. and 0.15 MPa of hydrogen was added into the autoclave. Propylene was added thereto while a stirring operation was being performed. Continuously added at a total pressure of 0.78 MPa, the propylene had been polymerized at 60° C. for 2.8 hours. At this time, a part of the polymer was sampled and analyzed, and the intrinsic viscosity was 1.16 dL/g.

After the completion of the polymerization, 50 milliliters of methanol was added to the polymer, then the temperature was lowered and the pressure was released. The total contents were transferred to a filtering tank equipped with a filter to add 100 milliliters of 1-butanol, and then the contents were stirred at 85° C. for 1 hour for solid-liquid separation. Further, a solid part was washed two times with 6 liters of heptane at 85° C. and dried under vacuum thereby providing 3.1 kg of a propylene-based polymer.

From the above-mentioned result, a polymerization weight ratio of the first stage to the second stage was 12.2/87.8. The intrinsic viscosity of the propylene-based polymer component generated at the second stage was calculated as 1.08 dL/g.

Subsequently, 600 ppm of IRGATOX 1010 (manufactured by Ciba Specialty Chemicals, Co., Ltd.) as an antioxidant and 500 ppm of calcium stearate as a neutralizing agent were added to be mixed therewith in relation to 100 parts by weight of powder of the thus obtained propylene-based multistage polymer. The mixture thereof was melt-mixed by Labo-Plastomill mono-axial extruder (manufactured by Toyo Seiki Seisaku-sho Ltd., 20 mm in diameter) at a temperature of 230° C. to form a propylene-based pellet. The solid property and resin characteristics of the resultant propylene-based multistage polymer are shown in Table 1.

(Solid Property and Resin Characteristics of Propylene-Based Multistage Polymer)

TABLE 1

|  |  | Production Example 1 |
|---|---|---|
| Propylene-based polymer component at 1st stage | Intrinsic viscosity (dL/g) | 14.1 |
|  | Weight fraction (mass %) | 12.2 |
| Propylene-based polymer component at 2nd stage | Intrinsic viscosity (dL/g) | 1.08 |
|  | Weight fraction (mass %) | 87.8 |
| Propylene-based polymer (pellet form) | Intrinsic viscosity (dL/g) | 2.67 |
|  | MFR (g/10 minutes) | 3.3 |
|  | MT (g) | 7.6 |
| Viscoelastic property | G'(10)/G'(1) | 2.68 |
|  | G'(0.1)/G'(0.01) | 2.96 |

Production Examples 2 to 6

Production Examples 2 to 6 were produced in processes similar to those of Production Example 1 as described above. The Production Examples 2 to 6 are different from the Production Example 1 in that the respective parts have different intrinsicviscosities and weight fractions.

For comparison, Conventional Product 1 general brand for extrusion: E-105GM) and Conventional Product 2 (general brand for foam-molding: pf-814) were used, in which neither the first stage nor the second stage were included.

TABLE 2

| Sample |  | Production Example 2 | Production Example 3 | Production Example 4 | Production Example 5 | Production Example 6 | Conventional product 1 | Conventional product 2 |
|---|---|---|---|---|---|---|---|---|
| Propylene-based polymer component at 1st stage | Intrinsic viscosity (dL/g) | 15 | 15 | 8.5 | 15 | 8.1 | — | — |
|  | Weight fraction (mass %) | 15 | 10 | 16 | 4.8 | 11 | — | — |

TABLE 2-continued

| Sample | | Production Example 2 | Production Example 3 | Production Example 4 | Production Example 5 | Production Example 6 | Conventional product 1 | Conventional product 2 |
|---|---|---|---|---|---|---|---|---|
| Propylene-based polymer component at 2nd stage | Intrinsic viscosity (dL/g) | 1.3 | 1.0 | 1.3 | 1.5 | 1.3 | — | — |
| | Weight fraction (mass %) | 85 | 90 | 84 | 95.2 | 89 | — | — |
| Propylene-based polymer | Intrinsic viscosity (dL/g) | 3.36 | 2.40 | 2.58 | 1.97 | 2.05 | 3.47 | 1.73 |
| | MFR (g/10 minute) | 2.7 | 2.65 | 2.3 | 11.7 | 7.9 | 0.5 | 2.5 |
| | MT (g) | 6.8 | 6.1 | 5.5 | 1.41 | 2.3 | 6.6 | — |

In accordance with the production examples as described above, an extruded propylene-based resin foam molded product (assembly of bundled threads of extruded foam) was provided. As the production method, each of a method using a tandem-type extrusion foam-molding device (Production Method 1) and a method using a MuCell injection molding machine (Production Method 2) was adopted.

Production Method 1

Examples 1 to 3/Comparative Examples 1 and 2

Propylene-based multistage polymers in pellet for obtained in Examples 1 to 5 as described above were respectively used as molding materials. Then, by use of a tandem-type extrusion foam-molding device disclosed in JP 2004-237729A (having two mono axial extruders: a monoaxial extruder having a screw diameter of ϕ50 mm and the other monoaxial extruder having a screw diameter of ϕ35 mm) and an assembly of a plurality of circular extrusion orifices (cylindrical dies) as a die, extruded propylene-based resin foam as a plate-shaped assembly of bundled threads of extruded foam was produced in the method as described below. In the produced extruded propylene-based resin foam, a plurality of extrusion-foamed threads were bundled together.

Note that the foaming was performed using a 50-mm-diameter monoaxial extruder by an injection of a $CO_2$-supercritical fluid.

Specifically, while the molding material was being melted using the 50-mm-diameter monoaxial extruder, the $CO_2$-supercritical fluid was injected. After the fluid was uniformly and sufficiently dissolved in the molten molding material, the material was extruded from the 35-mm-diameter monoaxial extruder connected thereto such that a resin temperature became 180° C. at the die-outlet of the extruder to mold extruded foam. The details of the conditions of the production are described below.

Note that as the resin temperature at the die-outlet of the 35-mm-diameter-monoaxial extruder, for example, a value obtained by measurement using a thermocouple thermometer may be adopted. The resin temperature may be considered to correspond to the temperature of a foaming molten resin when extruded.

(Production Condition)
$CO_2$-supercritical fluid: 7 mass %
Extrusion amount: 8 kg/hr
Resin pressure at upstream of die: 8 MPa
Extrusion temperature at outlet of die: 180° C.

The expansion ratio, the average cell diameter, and the closed cell content of the thus-obtained extruded propylene-based resin foam were respectively 31, 110 μm, and 60% when measured under the following conditions.

(Measurement Conditions)
Expansion ratio: The weight of the molded foam product obtained was divided by the volume thereof defined by a submerging method to obtain a density, and the expansion ratio was then calculated.

Average cell diameter: It was measured based on ASTM D3576-3577.

Closed cell content: It was measured based on ASTM D2856.

Thermal conductivity: It was evaluated based on JIS A1412

Figure 1:
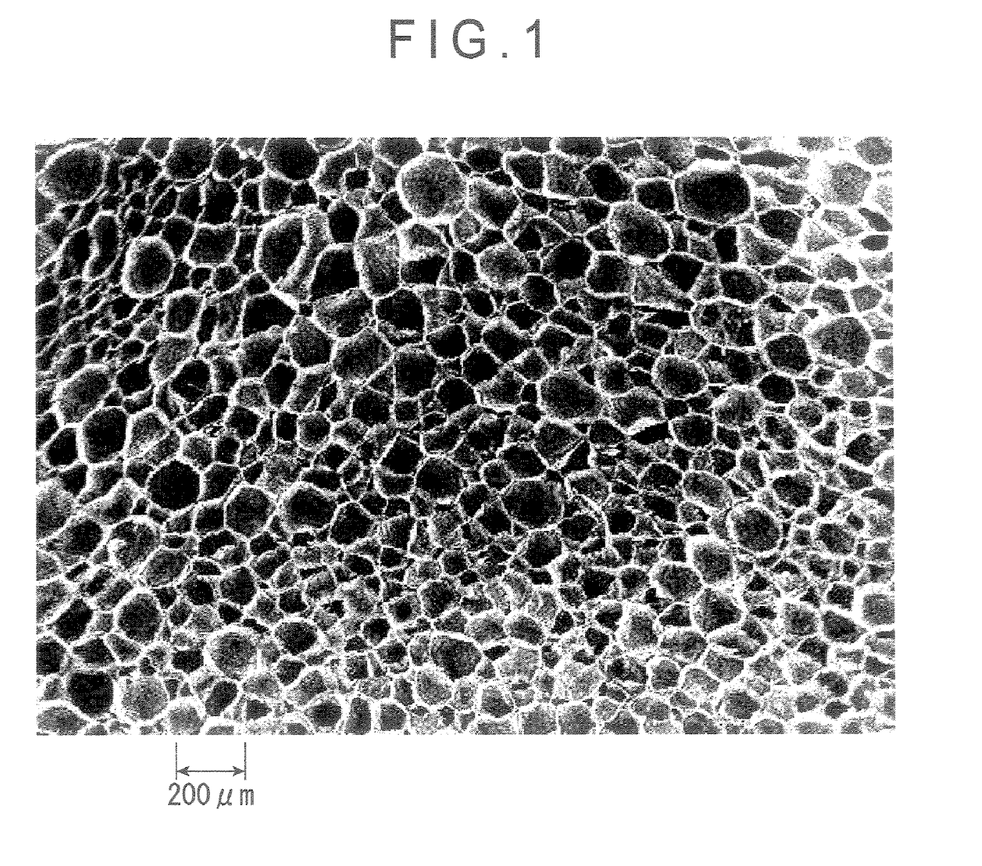
FIG. 1 is an electron micrograph of the cross section of an extruded propylene-based resin foam (assembly of bundled threads of extruded foam) obtained in Example 1 (a magnification of 50).

(Test Results)
FIG. 1 is an electron micrograph of the cross section of the extruded propylene-based resin foam obtained in Example 1 (Magnification of 50).

According to FIG. 1, a large number of foam cells having an average cell diameter of less than 400 μm are confirmed to be uniformly arranged on the extruded propylene-based resin foam obtained in Example 1.

For the state of foaming, the results shown in Table 3 were obtained

TABLE 3

| | Example 1 | Example 2 | Example 3 | Comparative Example 1 | Comparative Example 2 |
|---|---|---|---|---|---|
| Molding material | Production Example 1 | Production Example 2 | Production Example 3 | Production Example 4 | Production Example 5 |
| Expansion ratio | 31.0 | 32.2 | 31.1 | 28.4 | 21.3 |
| Average cell diameter | 110 | 167 | 185 | 281 | 248 |
| Closed cell content | 60 | 65.6 | 65.8 | 31.6 | 3.8 |

The molded products from Production Examples 1 to 3 attained sufficient closed cell content and could be qualified to be respectively Examples 1 to 3 of the present invention. However, the products from Production Examples 4 and 5 did not attain sufficient closed cell content, therefore they were referred as Comparative Examples 1 and 2.

With the thermal conductivity of 0.036 W/mk thus attained, it could be confirmed that the extruded foam of the present invention had an excellent insulation efficiency or heat-resisting property.

Production Method 2

Examples 4 and 5/Comparative Examples 3 to 6

Polypropylene-based multistage polymers of Production Examples 1 to 4 and 6 and Conventional Products 1 and 2 were used as molding materials and simply foamed using a MuCell injection molding machine. Then, test pieces were cut out of the molded product.

(Production Conditions)
Molding machine: J180 EL-MuCell manufactured by Japan Steel Works, Ltd.
 Injected time: 5 seconds
 Injection resin amount: 100 g
 Cylinder preset temperature: 180° C.
 Foaming agent: $CO_2$-supercritical fluid
 Gas volume: 5 wt %

(Test Results)
Results were obtained with respect to the state of air bubbles, as shown in Table 4.

TABLE 4

|  | Example 4 | Example 5 | Comparative Example 3 | Comparative Example 4 | Comparative Example 5 | Comparative Example 6 |
|---|---|---|---|---|---|---|
| Molding material | Production Example 2 | Production Example 3 | Production Example 4 | Production Example 6 | Conventional Product 1 | Conventional Product 2 |
| Expansion ratio | 24.0 | 25.4 | 18.4 | 16.9 | 5 | 12 |
| Average cell diameter | 100 | 102 | 170 | 207 | — | — |
| Closed cell content | 62.1 | 63.2 | 25.2 | 5.3 | — | — |
| Foam moldability | ○ | ○ | ○ | ○ | ○ | X |

The molded products from Production Examples 2 and 3 had sufficient closed cell content and qualified to be respectively Examples 4 and 5 of the present invention. However, the molded products from Production Examples 4 and 6 and Conventional Products 1 and 2 had insufficient closed cell content and thus referred to as Comparative Examples 3 to 6.

Evaluation of foam moldability was performed as follows:

At the time of molding a thread-shaped extruded foam, when it was confirmed that a protrusion was stable and variations in cell diameter and expansion ratio were small, the product was determined to be stable (mark ○). Likewise, when not stable, the product was determined to be unstable (mark X).

[Relation Between Results of Production Method 1 and Production Method 2]

According to Production Method 2 as described above, it is possible to evaluate by sampling a small amount (2 to 3 kg). If a relation between the experimental results of Production Method 2 and the results of the actual extrusion-foaming test is confirmed it becomes possible to evaluate the extrusion foaming properties by sampling a small amount as in Production Method 2. Thus, a relation between the foam moldability evaluated in the above tandem-type extrusion foam-molding device (Production Method 1) and the foam moldability evaluated in Production Method 2 was examined. For Production Examples 2 to 4, experiments were performed in accordance with both Production Method 1 and Production Method 2. As a result, as long as the foaming property was good (high expansion ratio, fine cell) in Production Method 1, it could be confirmed that foaming property was also good in Production Method 2. Therefore, the foam moldability in the general extrusion foam-molding process was confirmed to be evaluable using Production Method 2.

INDUSTRIAL APPLICABILITY

The extruded propylene-based resin foam according to the present invention can be advantageously used for structural materials that require insulation efficiencies in the fields of, for example, building construction, civil engineering and the fields of automobiles.

The invention claimed is:

1. An extruded propylene-based resin foam that is formed by extrusion-foaming a propylene-based resin, the extruded propylene-based resin foam having:
   an expansion ratio of 10 or more; and
   an average cell diameter of 200 μm or less,
   wherein the propylene-based resin is a propylene-based multistage polymer comprising the following constituents (A) and (B):
   (A) a first constituent having an intrinsic viscosity [η] of more than 10 dL/g and less than or equal to 20 dL/g which is measured in a tetralin solvent at 135° C. comprising a propylene homopolymer component or a copolymer component of propylene and α-olefin having a carbon number of 2 to 8, the first constituent occupying 8 to 20 mass % of the propylene-based multistage polymer; and
   (B) a second constituent having an intrinsic viscosity [η] of 0.5 to 3.0 dL/g which is measured in a tetralin solvent at 135° C. comprising a propylene homopolymer component or a copolymer component of propylene and α-olefin having a carbon number of 2 to 8, the second constituent occupying 80 to 92 mass % of the propylene-based multistage polymer,
   wherein the closed cell content of said propylene-based resin foam is 40% or more.

2. The extruded propylene-based resin foam according to claim 1, wherein the average cell diameter is 185 μm or less.

3. The extruded propylene-based resin foam according to claim 1, wherein the extruded propylene-based resin foam is an assembly of bundled threads of an extruded foam, in which a plurality of extrusion-foamed threads are bundled.

4. The extruded propylene-based resin foam according to claim 1, wherein
   the first constituent occupies 8 to 15 mass % of the propylene-based multistage polymer; and the second constituent occupies 85 to 92 mass % of the propylene-based multistage polymer.

5. The extruded propylene-based resin foam according to claim 4, wherein a relationship between a melt flow rate (MFR) at 230° C. and a melt tension (MT) at 230° C. of the propylene-based multistage polymer has satisfies the following expression (I):

$$\log(MT) > -1.33 \log(MFR) + 1.2 \quad (I).$$

6. The extruded propylene-based resin foam according to claim 1, wherein the propylene-based resin is a propylene-based multistage polymer consisting of constituents (A) and (B).

7. The extruded propylene-based resin foam according to claim 4, wherein the propylene-based resin is a propylene-based multistage polymer consisting of constituents (A) and (B).

8. The extruded propylene-based resin foam according to claim 1, wherein the propylene-based multistage polymer exhibits:
a ratio G'(10)/G'(1) of a storage modulus G'(10) at the angular frequency of 10 rad/s to
the storage modulus G'(1) at an angular frequency of 1 rad/s of 2.0 or more; and
a ratio G'(0.1)/G'(0.01) of the storage modulus G'(0.1) at an angular frequency of 0.1
rad/s to the storage modulus G'(0.01) at an angular frequency of 0.01 rad/s is 6.0 or less.

9. The extruded propylene-based resin foam according to claim 8, wherein the propylene-based multistage polymer exhibits:
a ratio G'(10)/G'(1) of a storage modulus G'(10) at the angular frequency of 10 rad/s to
the storage modulus G'(1) at an angular frequency of 1 rad/s of 2.5 or more; and
a ratio G'(0.1)/G'(0.01) of the storage modulus G'(0.1) at an angular frequency of 0.1
rad/s to the storage modulus G'(0.01) at an angular frequency of 0.01 rad/s is 4.0 or less.

10. The extruded propylene-based resin foam according to claim 1, wherein (A) has an intrinsic viscosity [η] of 12-20 dL/g and (B) has an intrinsic viscosity [η] of 0.8 to 2.0 dL/g.

11. The extruded propylene-based resin foam according to claim 1, wherein (A) has an intrinsic viscosity [η] of 13-18 dL/g.

12. The extruded propylene-based resin foam according to claim 1, wherein (A) has an intrinsic viscosity [η] of 13-18 dL/g and (B) has an intrinsic viscosity [η] of 0.8 to 2.0 dL/g.

13. The extruded propylene-based resin foam according to claim 1, wherein (B) has an intrinsic viscosity [η] of 1.0 to 1.5 dL/g.

14. The extruded propylene-based resin foam according to claim 12, wherein (B) has an intrinsic viscosity [η] of 1.0 to 1.5 dL/g.

15. The extruded propylene-based resin foam according to claim 1, wherein (B) has an intrinsic viscosity [η] of 0.8 to 2.0 dL/g.

16. The extruded propylene-based resin foam according to claim 4, wherein the extruded propylene-based resin foam is an assembly of bundled threads of an extruded foam, in which a plurality of extrusion-foamed threads are bundled.

17. The extruded propylene-based resin foam according to any one of claims 1, 2 to 5, 6 to 15 and 16, wherein the propylene-based multistage polymer is produced by polymerizing the propylene homopolymer component or the copolymer component of propylene and α-olefin having a carbon number of 2 to 8 in a polymerization procedure comprising two or more stages, in the presence of an olefin-polymerization catalyst comprising the following components (a) and (b) or the following components (a), (b), and (c):
(a) a solid catalyst component produced by processing titanium trichloride produced by reducing titanium tetrachloride with an organic aluminum compound by an ether compound and an electron acceptor;
(b) an organic aluminum compound; and
(c) a cyclic ester compound.

18. The extruded propylene-based resin foam according to claim 1, wherein the propylene-based multistage polymer is produced by polymerizing the propylene homopolymer component or the copolymer component of propylene and α-olefin having a carbon number of 2 to 8 in a polymerization procedure comprising two or more stages, in the presence of an olefin-polymerization catalyst comprising the following components (a), (b), and (c):
(a) a solid catalyst component produced by processing titanium trichloride produced by reducing titanium tetrachloride with an organic aluminum compound by an ether compound and an electron acceptor;
(b) an organic aluminum compound; and
(c) a cyclic ester compound,
wherein the (c) cyclic ester compound is at least one of γ-lactone, δ-lactone and ε-lactone.

19. The extruded propylene-based resin foam according to claim 1, wherein the first constituent occupies 10 to 20 mass % of the propylene-based multistage polymer; and the second constituent occupies 80 to 90 mass % of the propylene-based multistage polymer.

20. The extruded propylene-based resin foam according to claim 1, wherein the first constituent (A) consists of a propylene homopolymer, and the second constituent (B) consists of a propylene homopolymer.

21. The extruded propylene-based resin foam according to claim 20, wherein the propylene-based resin is a propylene-based multistage polymer consisting of constituents (A) and (B).

* * * * *